Feb. 21, 1967 C. R. WARD ETAL 3,304,615

THICKNESS MEASURING SYSTEM

Filed Feb. 28, 1963 6 Sheets-Sheet 1

INVENTORS
CECIL R. WARD
FRANK J. RAU
BY Oscar L. Spencer
ATTORNEY

INVENTORS
CECIL R. WARD
FRANK J. RAU
BY Oscar L. Spencer
ATTORNEY

Feb. 21, 1967

C. R. WARD ETAL 3,304,615

THICKNESS MEASURING SYSTEM

Filed Feb. 28, 1963

INVENTORS
*CECIL R. WARD*
*FRANK J. RAU*
BY *Oscar L. Spencer*
ATTORNEY

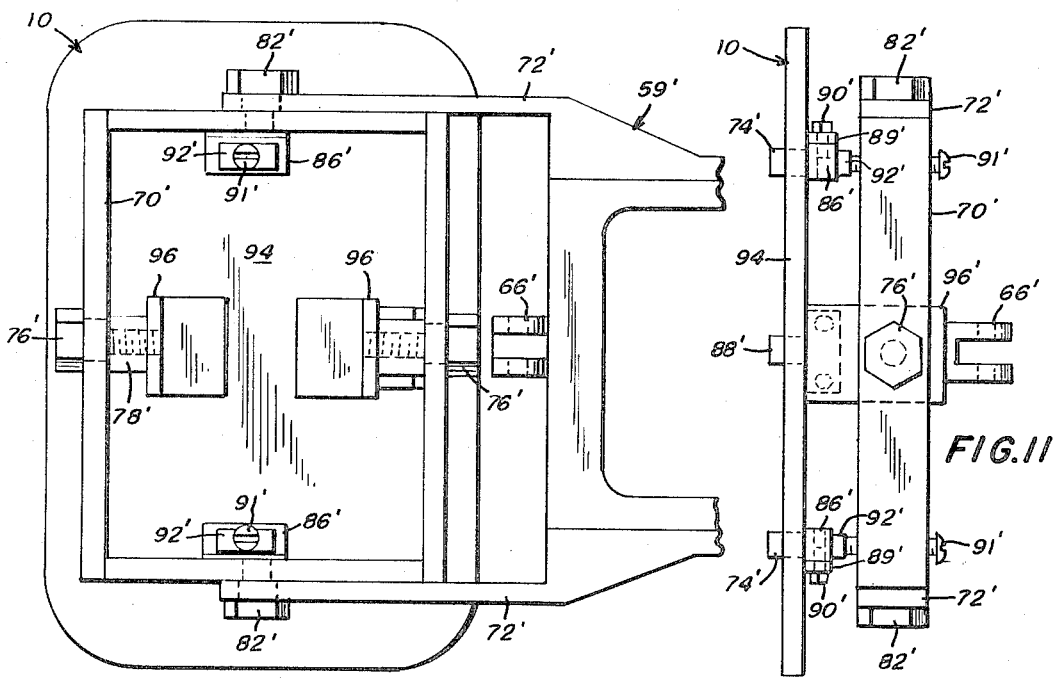
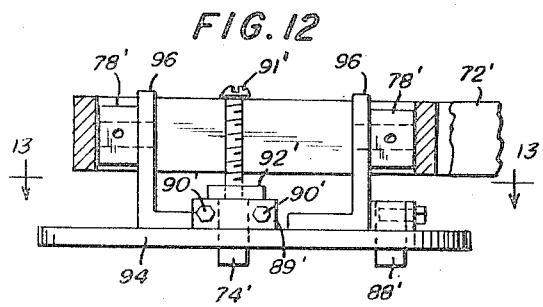
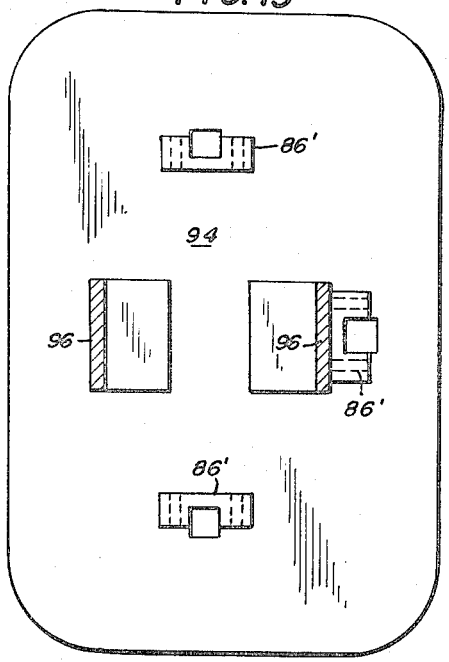
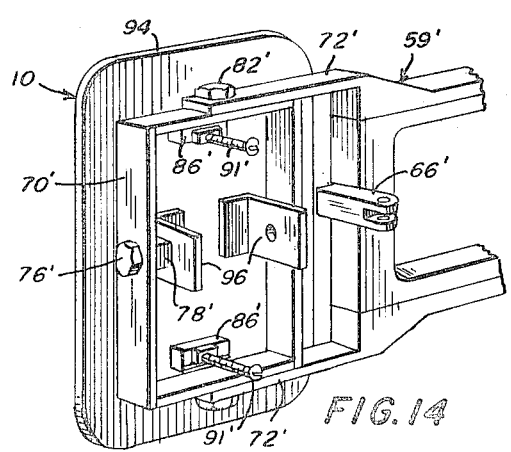

United States Patent Office 3,304,615
Patented Feb. 21, 1967

3,304,615
THICKNESS MEASURING SYSTEM
Cecil R. Ward, Gibsonia, and Frank J. Rau, Pittsburgh, Pa., assignors to Pittsburgh Glass Company, Pittsburgh, Pa., a corporation of Pennsylvania
Filed Feb. 28, 1963, Ser. No. 261,719
1 Claim. (Cl. 33—143)

This invention relates to a system for measuring the thickness of a moving sheet of material. It has found particular application in the glass industry in conjunction with apparatus for vertically drawing a sheet of glass from a pool of molten glass, but numerous other uses will be evident from the description hereinbelow.

Mechanical devices for measuring the thickness of a moving sheet of material are well known. These usually rely on the relative physical location of the various rails, arms and pointers used in the apparatus. Any undesired displacement of these mechanical structures will result in erroneous readings. The problems encountered in the glass drawing operation give example to the problems of such measurements, inasmuch as the width of the glass sheet is relatively large and the heat in the apparatus causes distortion in the parts of a mechanical measuring device.

It is an object of this invention to provide an accurate system for measuring the thickness of a traveling sheet of material. The subject system embodies one or more sensitive measuring elements which contact the material surface and traverse the surface at an angle to the direction of material travel. The measuring elements provide a signal which is indicative of the thickness of the material, regardless of the physical position of the structure which supports the measuring element. The signal is relayed to a remote location where it may be reduced to its mathematical equivalent, from which the thickness may be determined.

It is another object to provide a measuring system which is not closely allied to a physical reference point in order to determine measurements. By eliminating the need for such reference point, the problems resulting from mechanical inaccuracies and deflection due to heat and other physical forces is avoided. When the span across a sheet of material is considerable and heat is present, as in the glass drawing operation, physical forces frequently cause such inaccuracies which make the readings incorrect and of little value.

Another object is to provide a novel means for supporting a surface contacting measurement sensing element from a carriage which is movable longitudinally along a rail, the rail lying at an angle to the direction of travel of the measured surface. The movement of the carriage along the rail will cause the measurement sensing means to traverse the moving sheet, thus giving an accurate and representative profile of the material thickness. The novel supporting means assure that the pressure exerted on the sheet is minimal, in order to avoid damage to the material. Likewise, means are provided for retracting the measurement sensing element so that it no longer will touch the sheet of material.

A further object is to provide a measuring system which will directly give accurate thickness measurements without additional steps such as circuit balancing, reference to graphs, or the like.

These and other objects are realized by the instant invention, wherein a cooperating pair of measuring elements are disposed in facing relationship to each other and in contact with opposite sides of the material. The elements are supported from a movable carriage or carriages, and one of these elements has means for receiving a signal indicative of the distance between the elements.

Further understanding of the present invention may be found by referring to the drawings wherein;

FIGS. 10 through 14 are views of the armature measuring element and a portion of its supporting yoke, FIG. 10 showing a rear elevation, FIG. 11 showing a side elevation, FIG. 12 showing a plan view, FIG. 13 showing the armature plate detached from its support, and FIG. 14 showing a perspective view.

Figure 1:
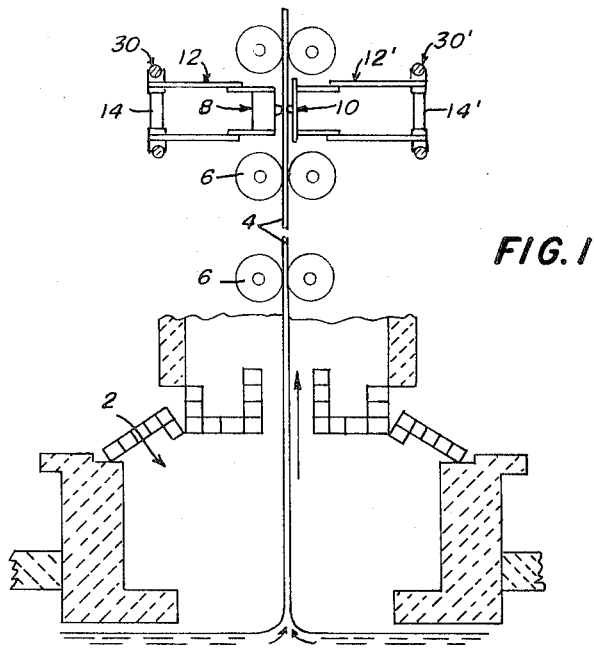
FIG. 1 is a sectional elevational view of the measuring system, showing its relationship to the structure of a conventional plate glass drawing furnace.
Figure 2:
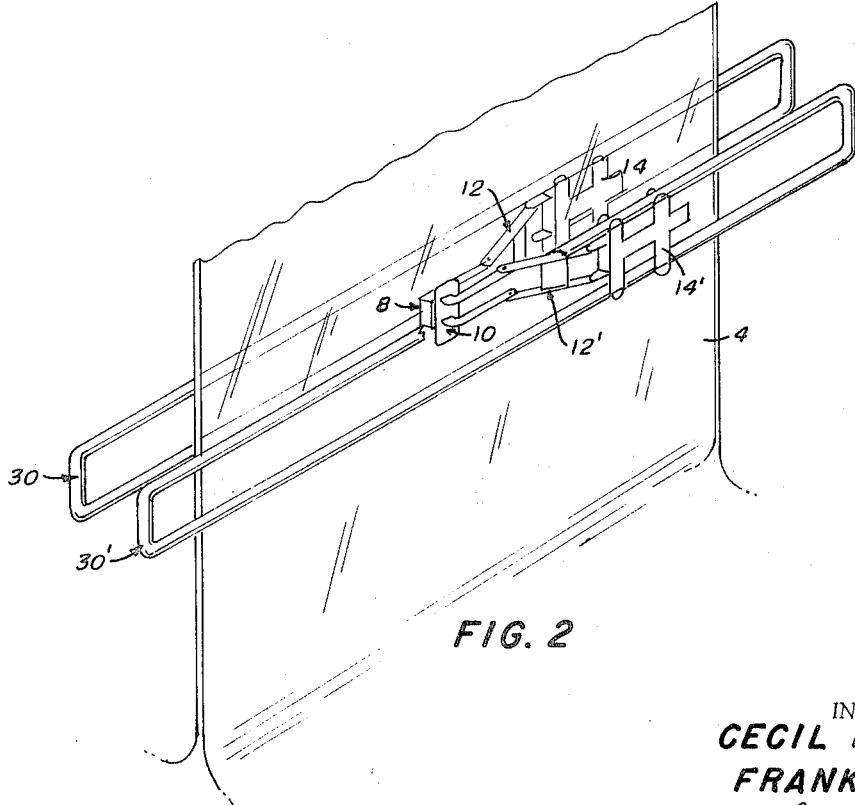
FIG. 2 is a perspective view showing the general arrangement of the measuring system.

The general disposition of the measuring system in relation to glass drawing apparatus may be seen in FIGS. 1 and 2. In the glass drawing apparatus, a pool of molten glass is contained within a drawing bay 2. A ribbon of glass 4 is drawn vertically therefrom by a series of drawing rollers 6 which are located in the leer casing. The measuring system is disposed between adjacent pairs of the drawing rollers, as seen in FIG. 1. Details of suitable drawing rollers may be seen in U.S. Patent 2,049,505 issued to D. R. Limbers on August 4, 1936.

As shown, the measuring system has a pair of measuring elements 8 and 10 riding against opposite sides of the glass. Each element is held against the glass by a support structure 12. The support structure is attached to a carriage 14 which is adapted to move longitudinally along a track or rail system 30 perpendicular to the direction of glass travel.

Figure 3:
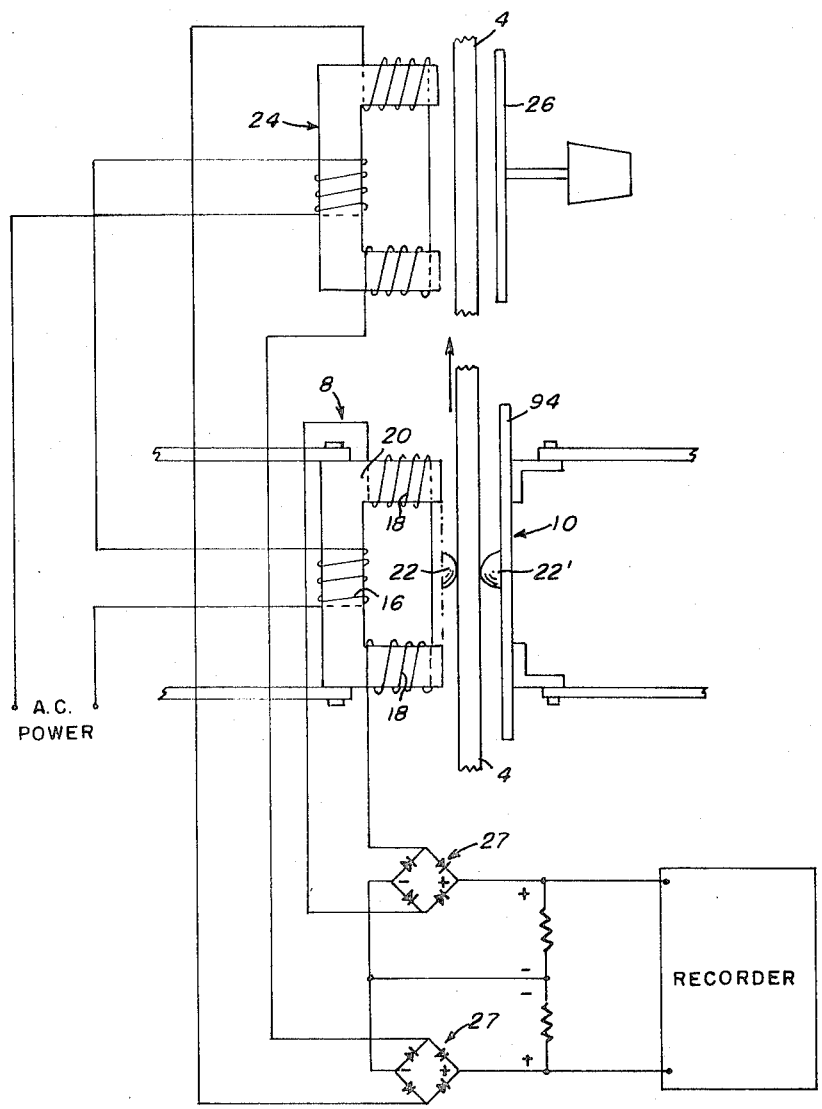
FIG. 3 is a schematic diagram of a measuring circuit which may be used with the instant invention.

The measuring elements 8 and 10 may determine the thickness of the material being measured in a number of manners. Those described herein utilize electromagnetic principles in that they cooperate to produce a signal which indicates the magnetic reluctance between the elements. Since the elements are held in contact with the glass, the reluctance between the elements 8 and 10 may be used to directly read the glass thickness. The element 8 is a transducer and element 10 is an armature. The cooperation between these in measuring the thickness of the glass is best seen in FIG. 3 where a schematic wiring diagram is shown.

The transducer 8 has a generally C-shaped core 20 with exciting windings 16 and secondary windings 18. A source of alternating current is led to the exciting windings. This induces a similar current in the secondary windings. The induced voltage varies with the intensity of the magnetic field through the core 20.

The armature 10, disposed on the opposite side of the glass, is made of a magnetic material such as iron and it offers a path which the magnetic flux from the transducer 8 may follow to complete a generally circular path. The transducer core 20 and the armature plate 94 are slightly spaced from the glass plate by hemispherical contacts 22. The distance between the armature 10 and transducer 8 is dependent wholly upon the thickness of the glass. Naturally, as the thickness of the glass becomes greater and the distance between the elements increase, the reluctance of the magnetic path between transducer and armature becomes greater. This reduces the intensity of the magnetic field passing through the core 20 and the voltage induced across the secondary windings 18 becomes less. This induced voltage is a signal indicative of the distance between the two cooperating measuring elements 8 and 10 and it may be used to measure the thickness of the glass.

A reference transducer 24 is used to obtain direct readings of glass thickness, and to compensate for fluctuations in line voltages and winding resistances.

The reference transducer 24 is of essentially identical structure to the transducer 8. A reference armature 26 is also used, to complete the magnetic circuit through the core in the reference transducer. Glass may be placed between the elements 24 and 26 since the magnetic reluctance of glass is slightly different than that of air.

The current from the secondary windings of each transducer is rectified in rectifier bridges 27. Then the resulting voltages are balanced in a bridge circuit. Any imbalance in the voltages indicates a difference of glass thicknesses between the reference transducer 24 and the transducer 8. The recorder may be calibrated to give a direct reading of glass thickness.

The subject measuring system is well adapted for use with control means in the glass drawing apparatus disclosed in applicants' copending application Serial Number 133,184, filed August 22, 1961.

By using the reference transducer, it can be seen that fluctuations in readings due to line voltage variations are avoided, since both transducers 8 and 24 have their primary windings excited by the same power source.

The support structure in FIG. 2 consists of arms with sufficient resiliency to bias the measuring elements against the glass sheet, the position of the carriage 14 and the presence of the hemispherical contacts 22 on the measuring elements serving to maintain the measuring elements in substantially parallel relationship to the plate of glass and to each other.

The support structure is attached to a carriage 14 which is movable in a linear path between a pair of spaced apart parallel rails, generally designated 30.

Rollers 32 and 34 are shaped to conform to the contour of the rails 36 and 38 to enable the carriage 14 to traverse the moving glass, and also hold the carriage in the desired orientation between the rails. The two lower rollers 32 ride on the lower rail 36, and the upper rollers 34 are in contact with the upper rail 38. The weight of the carriage is supported by the lower rail and the upper rail holds it in the desired position relative to the glass.

Means, more fully shown hereinafter, are provided to move the carriages along the rails in a manner so that the armature 10 will always be in parallel facing relationship to the transducer 8. To assure that the armature will always present an adequate area for the flux from the transducer, the armature has a larger surface area than the transducer. This will allow for slight inaccuracies when the armature is not located directly opposite the transducer. Errors of 0.125 inch in the alignment of the measuring elements will not affect the readings obtained therefrom.

Figure 4:
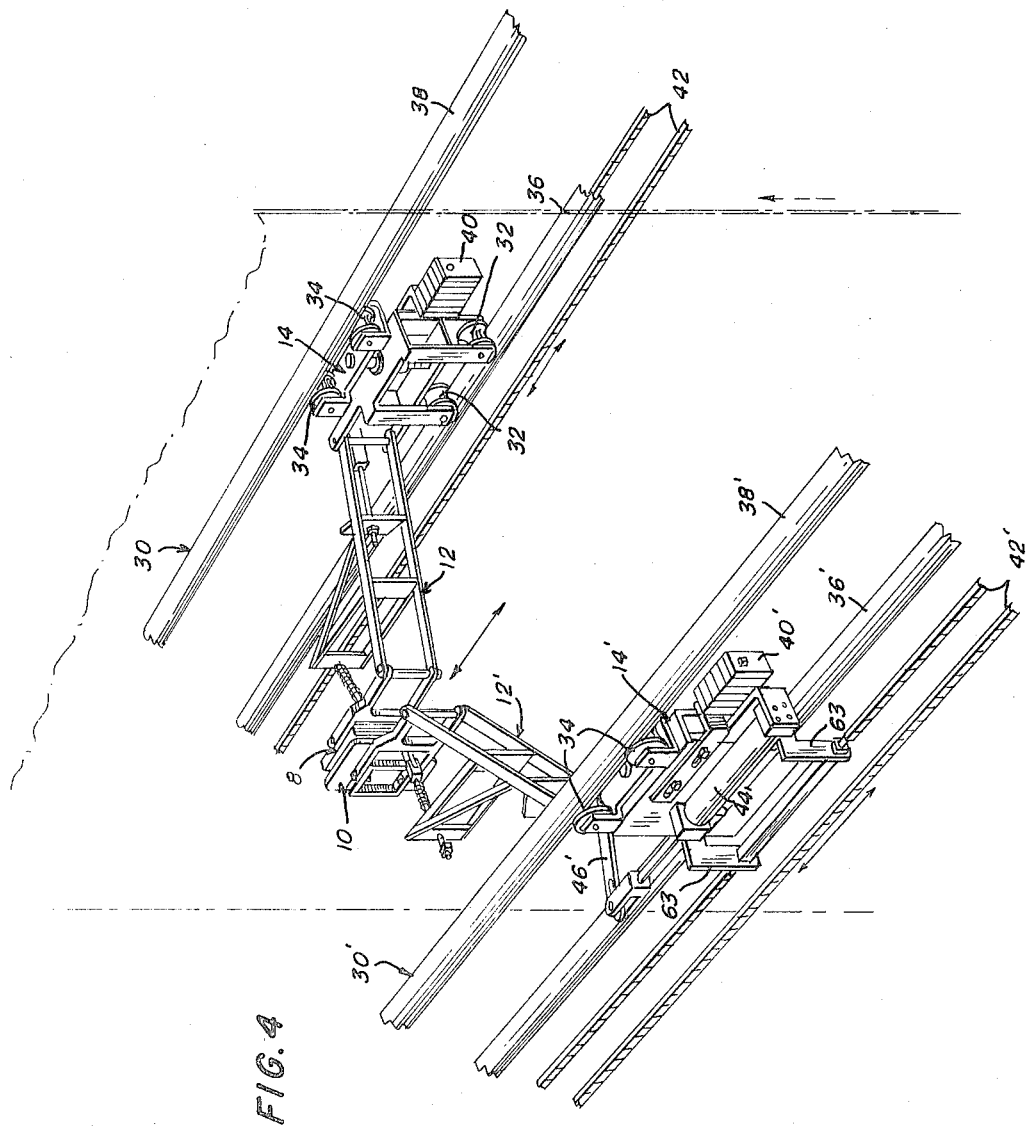
FIG. 4 is a perspective view of the measuring system.

A more detailed illustration of the measuring system is found in FIGS. 4 through 14. As can be seen in FIG. 4 the carriages are of similar structure, each having a body and sets of upper and lower rollers. A counterweight 40 balances the carriage by compensating for the weight of the measuring element and support structure. The counterweight is held to the carriage by bolts which pass through elongated holes in the counterweight supporting bar. By sliding the counterweight along the elongated holes, its position may be varied.

The carriage and support structure of the armature and transducer elements are of similar construction, and like parts on the armature structure are designated by primed numerals.

The carriage is traversed across the moving glass by chain means connected to arms 43 on the carriage body. The carriages are moved in a manner so that the transducer element and the armature element will remain in parallel facing relation.

Figure 5:
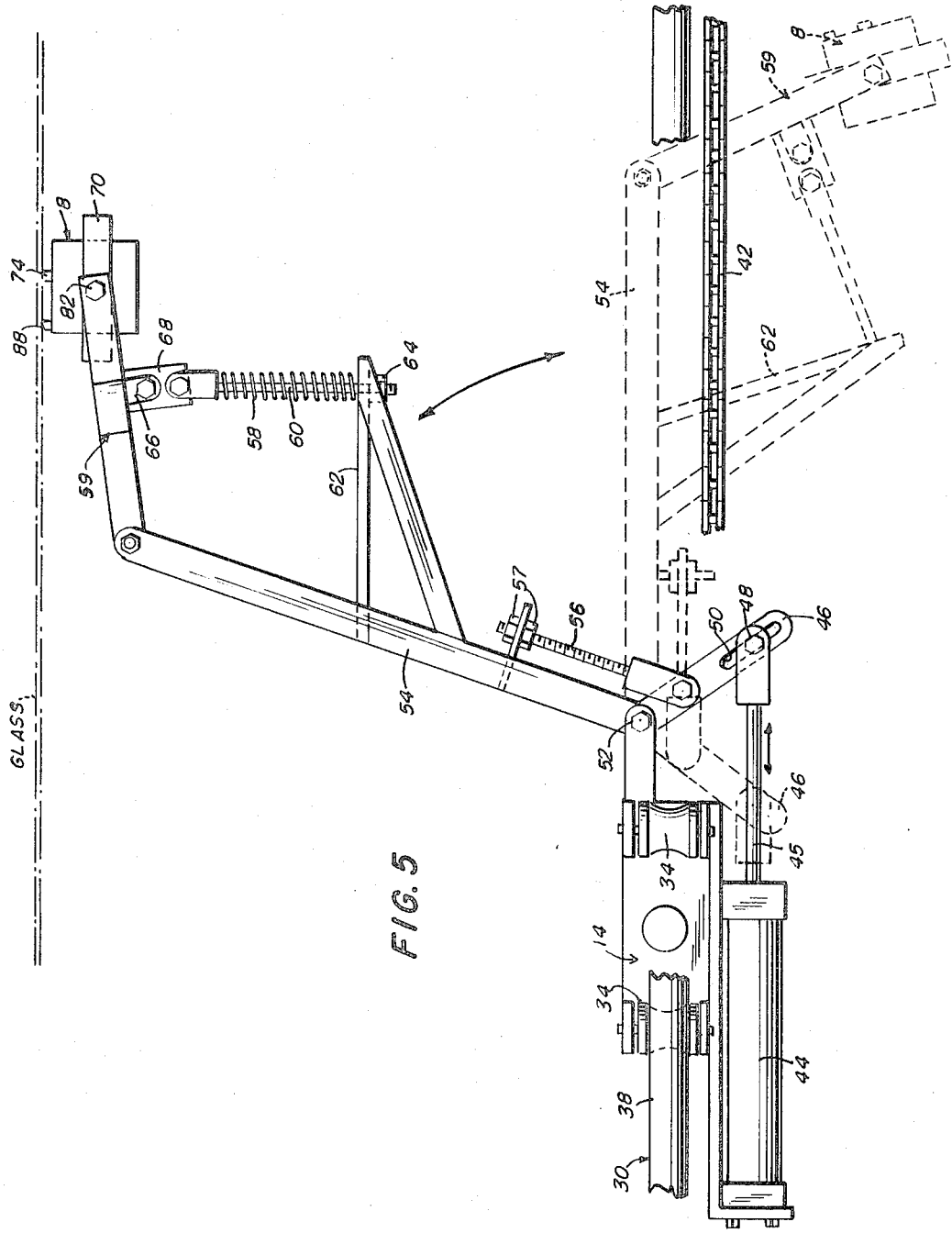
FIG. 5 is a plan view of one of the measuring elements with its supporting structure and carriage as used in the invention, some portions of the apparatus being removed for clarity.

The carriage shown in FIG. 4 also has a piston and cylinder assembly 44, actuated by fluid pressure, which may retract the support structure and the measuring elements to an inoperative position. The details of this retracting operation are seen in FIG. 5. The piston rod 45 is connected to actuating arm 46 by a bolt 48 which is freely slideable in the elongated hole 50 in arm 46. The opposite end of arm 46 is pivotally mounted on a bolt 52 on the carriage body. A support arm 54 is also pivotally mounted on bolt 52. An adjustable rigid connection which fixes the angle formed between arms 46 and 54 is provided by the threaded rod 56 which extends from a point intermediate the ends of actuating arm 46 to a plate secured to the side of the support arm 54. By adjusting the nuts 57 on rod 56, the angle between these arms may be varied to adjust the distance between the end of arm 54 and the glass.

When the measuring device is being used, it will be in the position shown in solid lines in FIG. 5. When the device is retracted it will take the position shown in phantom lines.

Figure 9:
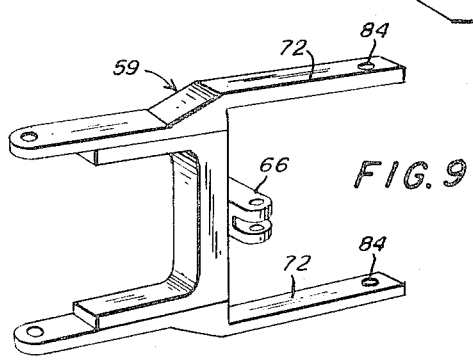
FIG. 9 is a perspective view of the yoke which supports the measuring elements.

A yoke 59 which supports the measuring element is pivotally attached to the outer end of the support arm 54. A perspective view of the yoke 59 is shown in FIG. 9. Resilient means such as a spring 58 are used to bias the measuring element against the sheet of glass. The spring 58 acts against the rear side of the yoke, and it is centered on a rod 60 which passes through a small aperture in an extension 62 on the support arm. The forward motion of the spring is limited by lock nuts 64, threaded on the outer end of rod 60. The opposite end of rod 60 attaches to a fitting 66 on the yoke through means of a small plate 68.

Preferably, the measuring elements are universally mounted, as by using a gimbaled structure or a ball joint. The details of gimbaled universal mountings for the armature and the transducer housing are seen in FIGS. 6 through 14.

The means for supporting both the transducer and the armature within their respective yokes is quite similar. In each, the measuring element is pivotally mounted about a horizontal axis within a ring or frame 70, see FIG. 8. The frame 70 is pivoted about a vertical axis within the arms 72 of the bifurcated yoke member 59, thus allowing for universal movement of the measuring element.

Furthermore, each of the measuring elements is provided with three contacts which ride on the face of the glass to keep the element in parallel relation thereto. Two of these contacts 74 on each measuring element are adjustable so that periodic recalibration may be made to compensate for contact wear.

Figure 6:
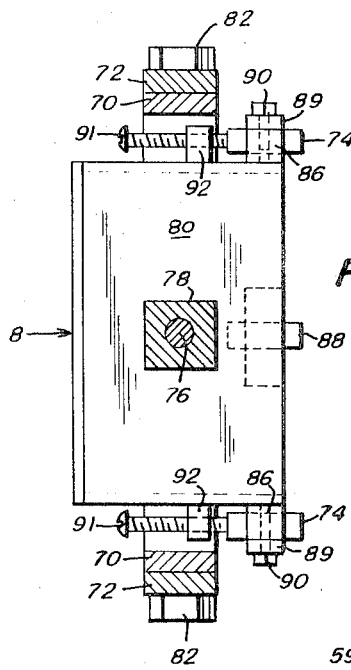
FIGS. 6, 7 and 8 are views of the transducer measuring element and its supporting yoke, FIG. 6 showing a cross-sectional side view taken along line 6—6 in FIG. 8, FIG. 7 showing a perspective view, and FIG. 8 showing a rear elevation.
Figure 7:
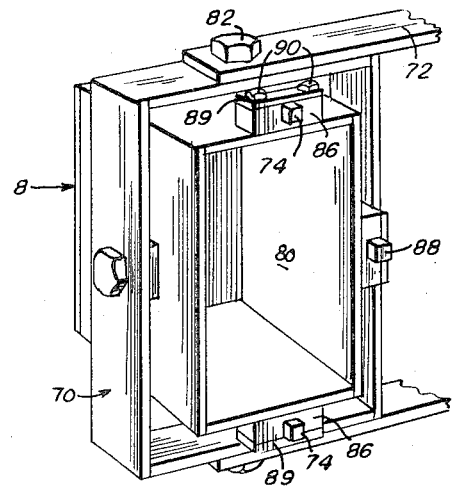
Figure 8:
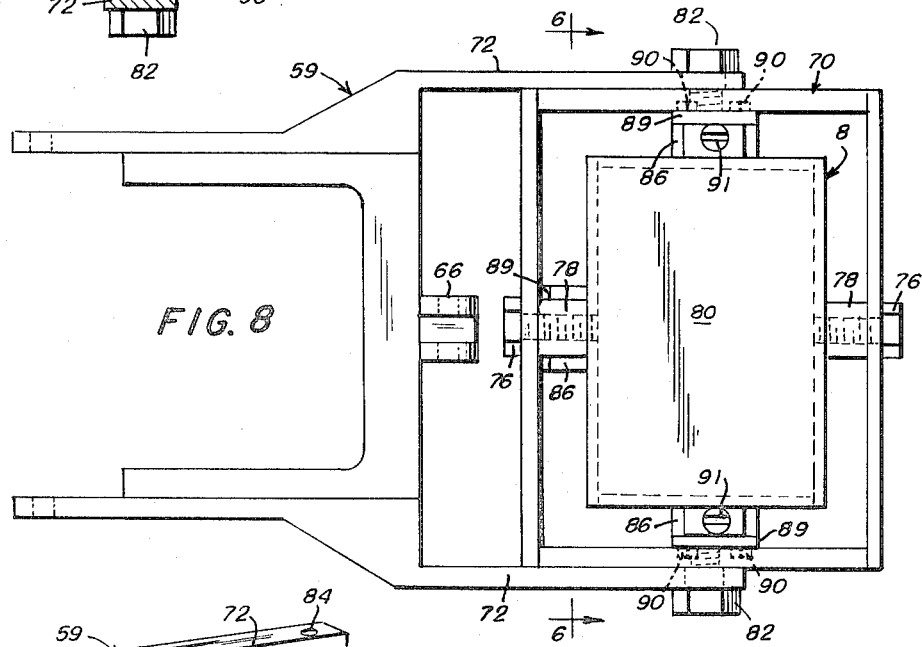

Referring to FIGS. 6, 7 and 8 it will be seen that the transducer housing 80 is pivotally connected to the rectangular frame 70 by means of horizontal pivot bolts 76 which pass unthreaded through the frame and are threaded into spacers 78 and the transducer housing 80. The spacers may be welded to the side of the housing. The frame 70 is similarly pivoted within the arms of the yoke 59, the vertical pivot bolts 82 passing through unthreaded apertures 84 in the yoke and being threaded into the frame 70. The pivot bolts 76 and 82 may be secured by cotter keys if desired.

Contact holders 86 are affixed to three sides of the transducer housing 80. One contact 88 cannot be precisely adjusted, but contacts 74 are easily adjusted. Each of the contact holders 86 has a generally square aperture for receiving the contact member. One side of this aperture is closed by a plate 89, held in position by bolts 90. When the bolts 90 are tightened, the plate 89 will bind the contact in position since the resulting aperture is one which will cause a strong interference fit with the contact. To assist in calibrating the device, two of the contacts 74 have adjusing bolts 91 which are threaded into nuts 92 projecting from and attached to the side of the housing 80. To adjust the contacts, the plate holding bolts 90 are loosened and adjusting bolts 91 are used to properly relocate the contacts. When the desired adjustment is made, bolts 90 are tightened to secure the contact in position.

The universal support arrangement for the armature is quite similar, as can be seen in FIGS. 10 through 14. Like primed numerals are used to indicate corresponding parts.

The armature plate 94, see FIG. 13, has two parallel tongues 96 extending rearwardly therefrom. A spacer 78' is attached to each tongue and the bolts 76' connect through the spacer to the tongue, thus supporting the armature.

In the armature structure, the nuts 92' for the adjusting bolts are directly secured to the rear side of the contact holder 86'.

In both measuring elements, the elements are maintained parallel to the glass and to each other by the structure described. For the measuring element to be stable, it is of course necessary that the point formed by the intersection of the vertical and horizontal pivot axes falls within the triangle described by the three contact points.

From the foregoing it can be readily seen that the invention disclosed provides a workable, efficient and accurate device for measuring the thickness of a moving sheet of material by continually traversing the surface thereof.

It is understood that the invention is not limited by the description appearing hereabove, but by the following claim.

We claim:

Apparatus for determining the thickness of a sheet of material, said apparatus having a cooperating pair of electromagnetic measuring elements disposed in facing relationship to each other and in contact with opposite sides of the material, each of said measuring elements having three projections contacting said material and oriented in parallel relation to the surface of said material, means supporting each of said measuring elements for universal movement from a transversely movable carriage, means biasing each said measuring element against said material, a first of said measuring elements having means for receiving a signal independent of its carriage and indicative of the actual distance and the magnetic reluctance between said elements, and the other said measuring element having dimensions which are greater than those of said first element in planes parallel to the plane of the material.

References Cited by the Examiner

UNITED STATES PATENTS

| | | | |
|---|---|---|---|
| 1,946,924 | 2/1934 | Allen | 33—147 |
| 2,266,620 | 12/1941 | Coffman | 33—147 |
| 2,439,595 | 4/1948 | Cooke | 33—178 |
| 2,511,276 | 6/1950 | Ljungstrom | 33—143 |
| 2,876,551 | 2/1959 | Bowlby | 33—147 |
| 3,164,981 | 1/1965 | Knobel | 33—147 |

LEONARD FORMAN, *Primary Examiner.*

ISAAC LISANN, LOUIS R. PRINCE, J. RENJILIAN,
*Assistant Examiners.*